(12) United States Patent
Chamberlain

(10) Patent No.: US 8,509,341 B2
(45) Date of Patent: *Aug. 13, 2013

(54) COMMUNICATIONS DEVICE INCLUDING A FILTER FOR NOTCHING WIDEBAND TRANSMIT SIGNALS AND ASSOCIATED METHODS

(75) Inventor: Mark Chamberlain, Honeoye Falls, NY (US)

(73) Assignee: Harris Corporation, Melbourne, FL (US)

( * ) Notice: Subject to any disclaimer, the term of this patent is extended or adjusted under 35 U.S.C. 154(b) by 1144 days.

This patent is subject to a terminal disclaimer.

(21) Appl. No.: 12/331,797

(22) Filed: Dec. 10, 2008

(65) Prior Publication Data

US 2010/0142605 A1 Jun. 10, 2010

(51) Int. Cl.
*H04L 27/00* (2006.01)

(52) U.S. Cl.
USPC ........... 375/295; 329/318; 329/319; 329/320; 329/349; 332/107; 332/123; 332/162

(58) Field of Classification Search
None
See application file for complete search history.

(56) References Cited

U.S. PATENT DOCUMENTS 5,612,978 A * 3/1997 Blanchard et al. ............ 375/350
2007/0201590 A1 * 8/2007 Kolze et al. .................... 375/350

OTHER PUBLICATIONS

Crochiere et al.—Multirate Digital Signal Processing, Prentice Hall, 1983, pp. 136-139. ISBN 0-13-605162-6.*
Spooner, Chad M., *Filterbanks for Adaptive Transmit Filtering*, 2007, IEEE 1-4244-1513-06/07.
Bahr, Randall K., et al *MUOS U2B Interference Mitigation Analysis*, 2007, IEEE 1-4244-1513-06/07.
Kumm, Keith, *MUOS Spectrum Notching Effect on Handheld Terminal Uplink Performance 2007*, IEEE 1-4244-1513-06/07.

* cited by examiner

*Primary Examiner* — Adolf Dsouza
(74) *Attorney, Agent, or Firm* — Allen, Dyer, Doppelt, Milbrath & Gilchrist, P.A.

(57) ABSTRACT

A communications device includes a modulator and a filter downstream therefrom and operable to generate an output wideband complex signal with a frequency notch therein. The filter includes a finite impulse response (FIR) filter with L taps to generate N output values, with L>N. A Fast Fourier Transform (FFT) block is downstream from the FIR filter and has a length N so that filter transition regions occur between frequency bins of the FFT block. A notching block is downstream from the FFT block to generate the frequency notch. An Inverse Fast Fourier Transform (IFFT) block is downstream from the notching block and has the length N.

24 Claims, 9 Drawing Sheets

US 8,509,341 B2

COMMUNICATIONS DEVICE INCLUDING A FILTER FOR NOTCHING WIDEBAND TRANSMIT SIGNALS AND ASSOCIATED METHODS

FIELD OF THE INVENTION

The present invention relates to the field of communications devices, and more particularly, to a communications device including a filter for notching wideband transmit signals to allow signal coexistence with narrowband communication devices.

BACKGROUND OF THE INVENTION

Wideband communications devices typically operate with a wideband complex signal, and can interfere with narrowband communications devices. Interference with narrowband communications devices may cause a loss of critical communication links. For wideband and narrowband communication devices to coexist, the wideband complex signal being transmitted may be filtered to generate notches overlapping the operating frequencies of the narrowband communication devices.

An example wideband communications device is a satellite communications system known as MUOS (Mobile User Objective System). The MUOS satellite communications system operates in the UHF band. The MUOS system is designed to reduce the impact on nearby narrowband communications devices by using an adaptive notch-on-transmit filter.

There are several approaches for providing an adaptive notch-on-transmit filter for notching the MUOS waveform. Each approach uses a different filter bank structure that affects processor loading and memory requirements. For example, a paper titled "Filterbanks For Adaptive Transmit Filtering" by Chad Spooner discloses notch-on-transmit algorithms that focus on a DFT filterbank and on a modified DFT (mDFT) filterbank.

The DFT filterbank is applied to the waveform in a sliding block manner. In the mDFT, the input signal is simultaneously applied to each of the sub-band branches of the filterbank. Analysis filters are immediately applied to the input data. Each analysis filter is a frequency-shifted version of a real-valued low pass filter. The outputs of the analysis filters are decimated, and the real and imagery parts of the result are alternately taken over time. The parallel operations result in real and imagery components for each input block of complex numbers, just as in the DFT filterbank. The difference between the mDFT and the DFT filterbanks is that the exact sub-band filtering characteristics are under a designer's direct control in the mDFT filterbank. Even in view of the DFT filterbank and the modified DFT (mDFT) filterbank, processor loading and memory requirements are not significantly reduced.

A paper titled "MUOS Spectrum Notching Effect On Handheld Terminal Uplink Performance" by Kumm et al. discusses the effect of the peak-to-average power ratio (PAPR) of the spectrally adaptive waveform in terms of performance. The PAPR increases with an increasing notching bandwidth in the spectrally adaptive waveform as compared to an un-notched waveform. With spectrally adaptive notching, the dynamic range of the communications device transmitting the waveform is "squeezed" by the need to preserve PAPR while meeting a maximum power limit. The paper concludes that there is no straightforward way to reduce PAPR into the power amplifier of the communications device transmitting the waveform so as to boost output power of the required notch depth and out-of-band requirements. In addition, the paper fails to address reducing processor loading and memory requirements when generating the notching in the spectrally adaptive waveform.

SUMMARY OF THE INVENTION

In view of the foregoing background, it is therefore an object of the present invention to adaptively notch a wideband transmit signal to allow signal coexistence with narrowband communication devices while reducing processor loading and memory requirements.

This and other objects, features, and advantages in accordance with the present invention are provided by a communications device comprising a modulator and a filter downstream therefrom and operable to generate an output wideband complex signal with at least one frequency notch therein. The filter may comprise a finite impulse response (FIR) filter comprising L taps to generate N output values, with L>N, and a Fast Fourier Transform (FFT) block downstream from the FIR filter and having a length N so that filter transition regions occur between frequency bins of the FFT block. A notching block may be downstream from the FFT block to generate the at least one frequency notch. An Inverse Fast Fourier Transform (IFFT) block may be downstream from the notching block and has the length N.

The size of the FFT block is advantageously matched to the outputs of the FIR filter, and the FIR filter functions as a reference filter. The reference filter is effectively being applied to each frequency bin in the frequency domain as a window. This window is being applied across the FFT history to implement a larger effective filter using the fact that the signal is also being decimated. Because of "zeros" in the window function, a small number of multiples are required to create the output wideband complex signal. Consequently, processor loading and memory requirements may be advantageously reduced when adaptively notching a wideband transmit signal to allow signal coexistence with narrowband communication devices.

The filter may operate with a block length of M, with $M=N/2$, and wherein the N output values are filtered every M samples in time. The filter may further comprise an interpolate block downstream from the IFFT. The FIR filter may have an impulse response with zeros at N spaced values.

The filter may have a filter gain halfway between frequency bins of the FFT block with a magnitude of at least 0.5, and is anti-symmetric so that a composite filter bank is spectrally flat. The FFT block may have a gain of 0 one frequency bin away from a center frequency bin to reduce FFT leakage between frequency bins. Reducing leakage between frequency bins advantageously reduces splatter and spillover, which improves performance of the filter.

The filter adaptively changes the at least one frequency notch. The filter may operate within a range of 300 to 3,000 MHz, for example. The filter may operate over a bandwidth within a range of about 4 to 5 MHz, for example.

Another aspect of the present invention is directed to a wideband communications device comprising a receiver to periodically operate in a scan mode for receiving a narrowband signal from at least one narrowband communications device, and a signal analyzer downstream from the receiver to determine a frequency of the received narrowband signal. A modulator and a filter downstream from the modulator may generate an output wideband complex signal with at least one frequency notch therein. The filter may be configured as defined above. The at least one frequency notch may correspond to the frequency of the narrowband communications devices as determined by the signal analyzer. The wideband communications device may further comprise a transmitter downstream from the filter to transmit the output wideband complex signal with at least one frequency notch therein.

Yet another aspect of the present invention is directed to a method for generating an output wideband complex signal with at least one frequency notch therein. The method comprises modulating an output wideband complex signal to be transmitted, and using a filter for filtering the modulated output wideband complex signal to include the at least one frequency notch therein. The filtering may comprise filtering the modulated output wideband complex signal using a finite impulse response (FIR) filter comprising L taps to generate N output values, with L>N, and generating a Fourier transform of the modulated wideband complex signal using a Fast Fourier Transform (FFT) block downstream from the FIR filter. The FFT block may have a length N so that filter transition regions occur between frequency bins of the FFT block. The filtering may further comprise generating the at least one frequency notch in the Fourier transform using a notching block downstream from the FFT block, and generating an inverse Fourier transform of the Fourier transform with the at least one frequency notch therein using an Inverse Fast Fourier Transform (IFFT) block downstream from the notching block, with the IFFT block having the length N.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and completer and will fully convey the scope of the invention to those skilled in the art. Like numbers refer to like elements throughout.

Figure 1:
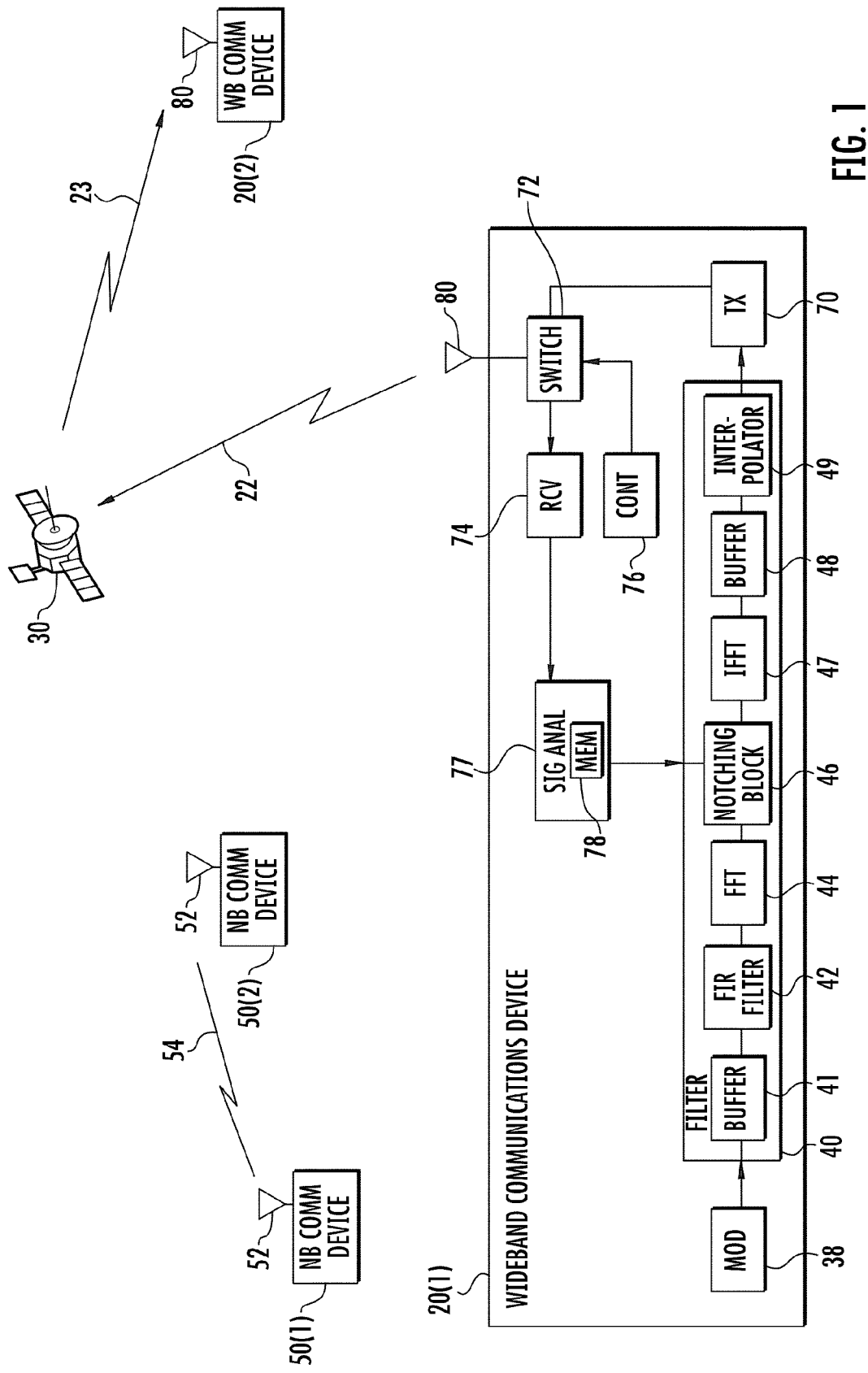
FIG. 1 is a block diagram of a wideband communications device transmitting a wideband complex signal within a satellite communications system in the presence of narrowband communications device in accordance with the present invention.

Referring initially to FIG. 1, a wideband communications device 20(1) will now be discussed. The illustrated wideband communications device 20(1) communicates with another wideband communications device 20(2) via a satellite 30. The wideband communications device 20(1), 20(2) may form a network of or be part of a network of wideband communications devices. The transmit link from the wideband communications devices 20(1) to the satellite 30 is known as the uplink 22, whereas the receive link by the other wideband communications devices 20(2) from the satellite 30 is known as the downlink 23. The frequency of the output wideband complex signal for the uplink 22 is different than the frequency of the output wideband complex signal for the downlink 23.

As will be discussed in greater detail below, each wideband communications device 20(1), 20(2) includes a filter 40 for notching the output wideband complex signal being transmitted to allow signal coexistence with narrowband communications devices 50(1) and 50(2) operating in the general area. Each of the narrowband communications devices 50(1), 50(2) includes an antenna 52, and communications therebetween is over link 54. The narrowband communications devices 50(1), 50(2) have an operating bandwidth that is typically less than 100 kHz, for example. In contrast, a bandwidth of the output wideband complex signal is typically in the MHz range, i.e., greater than 1 MHz.

The illustrated network of wideband communications devices 20(1), 20(2) is a satellite communications system. The satellite communications system may be a MUOS (Mobile User Objective System) satellite communications system, for example. In a MUOS satellite communications system, the bandwidth of the output wideband complex signal is about 5 MHz. When filter roll-off is taken into consideration, the bandwidth is about 4.7 MHz. The uplink transmits on frequencies near 310 MHz and the down link receives on frequencies near 370 MHz for the MUOS satellite communications system.

The operating frequency of the filter 40 may be configured to cover the UHF band, i.e., within a range of 300 to 3,000 MHz. Nonetheless, the filter 40 may be designed to operate over different frequency ranges as readily appreciated by those skilled in the art. In addition, the bandwidth of the output wideband complex signal is not limited to 5 MHz. The bandwidth may vary within a range of 1 to 5 MHz, for example.

Interference of the transmitted output wideband complex signal from the wideband communications device 20(1) with the narrowband communications devices 50(1), 50(2) may cause a loss of critical communications over link 54. For the wideband and narrowband communications devices 20(1), 20(2) and 50(1), 50(2) to co-exist, the output wideband complex signal is filtered before being transmitted to generate frequency notches overlapping the operating frequencies of the narrowband communication devices.

The output wideband complex signal may be a direct sequence spread spectrum signal, for example. Due to the large spreading gain of such a signal, a significant amount of the signal can be frequency notched before serious communication degradation results. For example, up to 25% of the signal may be notched.

In the illustrated wideband communications device 20(1), the filter 40 is between a modulator 38 and a transmitter 70. The filter 40 includes a notching block 46 for generating the output wideband complex signal with at least one frequency notch therein. The at least one frequency notch corresponds to the operating frequency of the narrowband communications devices 50(1), 50(2). Additional frequency notches may be formed in the output wideband complex signal by the notching block 46 based on the known operating frequencies of other narrowband communications devices operating in the area, as readily appreciated by those skilled in the art.

The filter 40 comprises an input buffer 41 for buffering the modulated signal provided by the modulator 38, and a finite impulse response (FIR) filter 42 is downstream from the input buffer. The FIR filter 42 comprises L taps to generate N output values, with L>N. A Fast Fourier Transform (FFT) block 44 is downstream from the FIR filter 42 and has a length N so that filter transition regions occur between frequency bins of the FFT block.

The size of the FFT block 44 is advantageously matched to the outputs of the FIR filter 42, and the FIR filter 42 functions as a reference filter. The reference filter is effectively being applied to each frequency bin in the frequency domain as a window. This window is being applied across the FFT history to implement a larger effective filter using the fact that the signal is also being decimated. Because of "zeros" in the window function, a small number of multiples are required to create the output wideband complex signal. Consequently, processor loading and memory requirements may be advantageously reduced when adaptively notching a wideband transmit signal to allow signal coexistence with narrowband communication devices.

Normally, the FFT block 44 functions as a reference filter, as discussed in the background section. As a result of the FIR filter 42 performing, in effect, sub-band filtering, the FFT block 44 has a gain of 0 one frequency bin away from a center frequency bin to reduce FET leakage (e.g., splatter/spillover) between frequency bins in the FFT block 44.

The notching block 46 is downstream from the FFT block 44 to generate the frequency notches in the output wideband complex signal. Determination of the frequency notches will be discussed in greater detail when reference is made to the flowchart 100 in FIG. 2.

An Inverse Fast Fourier Transform (IFFT) block 47 is downstream from the notching block 46 and also has a length N. An output buffer 48 is downstream from the IFFT block 47 for buffering the outputs therefrom. An interpolator 49 is downstream from the output buffer 48 for interpolating values between the frequency bins. As part of the interpolating, an overlay and add is performed to provide a high enough sample rate to reconstruct the output of each of the N frequency bins. The sampling needs to be twice as fast as the bandwidth, as stated by the Nyquest theorem. The transmitter 70 transmits the output wideband complex signal with the frequency notches therein via antenna 80.

A switch 72 is coupled between the transmitter 70 and the antenna 80. The switch 72 is also coupled to a receiver 74. A controller 76 is coupled to the switch 72 for selectively connecting the antenna 80 to the receiver 74, or connecting the antenna 80 to the transmitter 70. The receiver 74 is selected when the wideband communications device 20(1) is to operate in a scan mode, and the transmitter 70 is selected when the wideband communications device 20(1) is to operate in a transmit mode.

Figure 2:
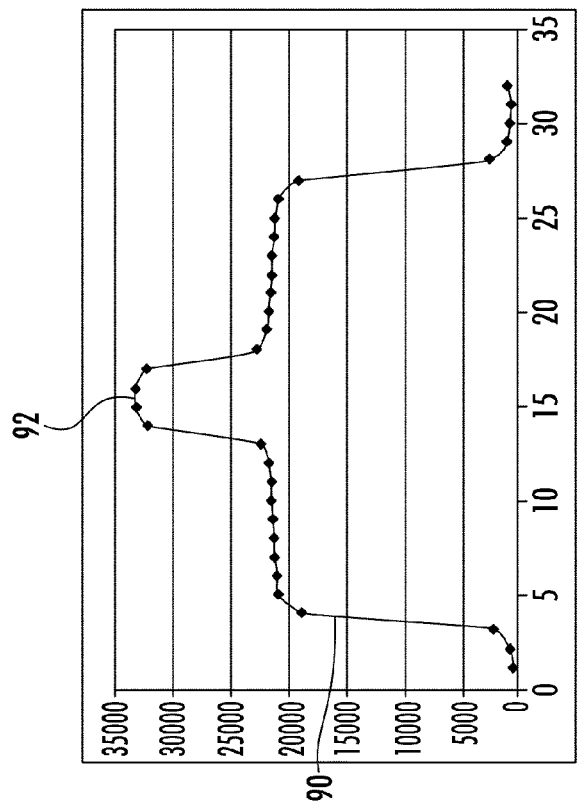
FIG. 2 is a graph illustrating a sampled signal spectrum received by the wideband communications device when in a scan mode in accordance with the present invention.

In the scan mode, the receiver 74 listens for narrowband communications devices that are operating in the area. This includes the illustrated narrowband communications devices 50(1), 50(2) as well as other devices operating in the general area. For illustration purposes, FIG. 2 illustrates a sampled signal spectrum 90 received by the wideband communications device 20(1) when in the scan mode. The sampled signal spectrum 90 includes a spike 92 corresponding to an operating frequency of the narrowband communications devices 50(1), 50(2).

Since the wideband communications devices 20(1), 20(2) are networked together, they both switch to the scan mode so that neither one is transmitting. The scan mode may also be referred to as a learning mode. The sampled signal spectrum 90 is provided by the receiver 74 to a signal analyzer 77. The signal analyzer 77 analyzes the sampled signal spectrum 90 for determining the location of where the frequency notches are to be generated in the output wideband complex signal. Once the locations of the frequency notches are determined, this information is passed to the filter 40, and in particular, to the notching block 46.

Figure 3:
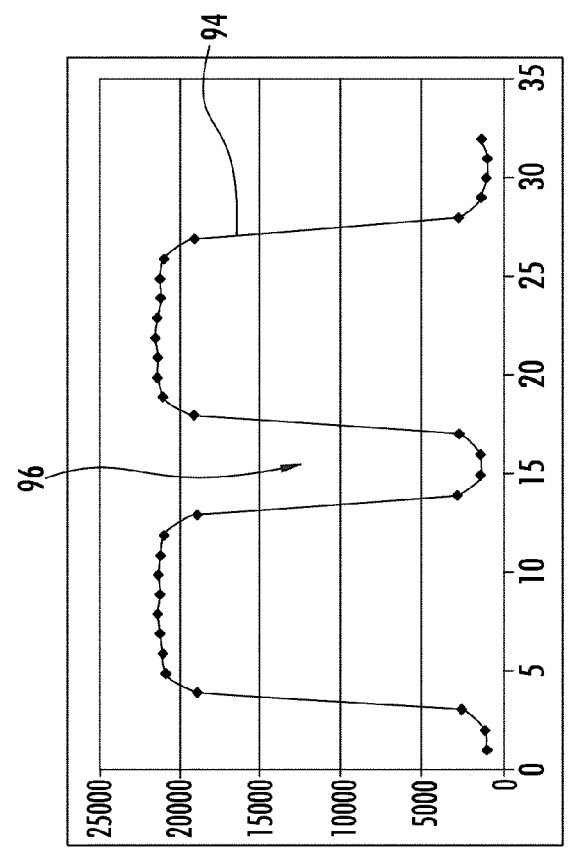
FIG. 3 is a graph illustrating an output wideband complex signal with a notch generated therein based on the sampled signal spectrum shown in FIG. 2.

In response to the sampled signal spectrum 90, the filter 40 provides an output wideband complex signal 94 with a frequency notch 96 generated therein as best illustrated in FIG. 3. The frequency notch 96 allows for the spike 92 in the sampled signal spectrum 90. As noted above, the spike 92 corresponds to the operating frequency of the narrowband communications devices 50(1), 50(2). Consequently, the frequency notch 96 in the output wideband complex signal 94 allows the narrowband communications devices 50(1), 50(2) to communicate while the wideband communications device 20(1) communicates with the other wideband communications device 20(2) via satellite 30.

Figure 4:
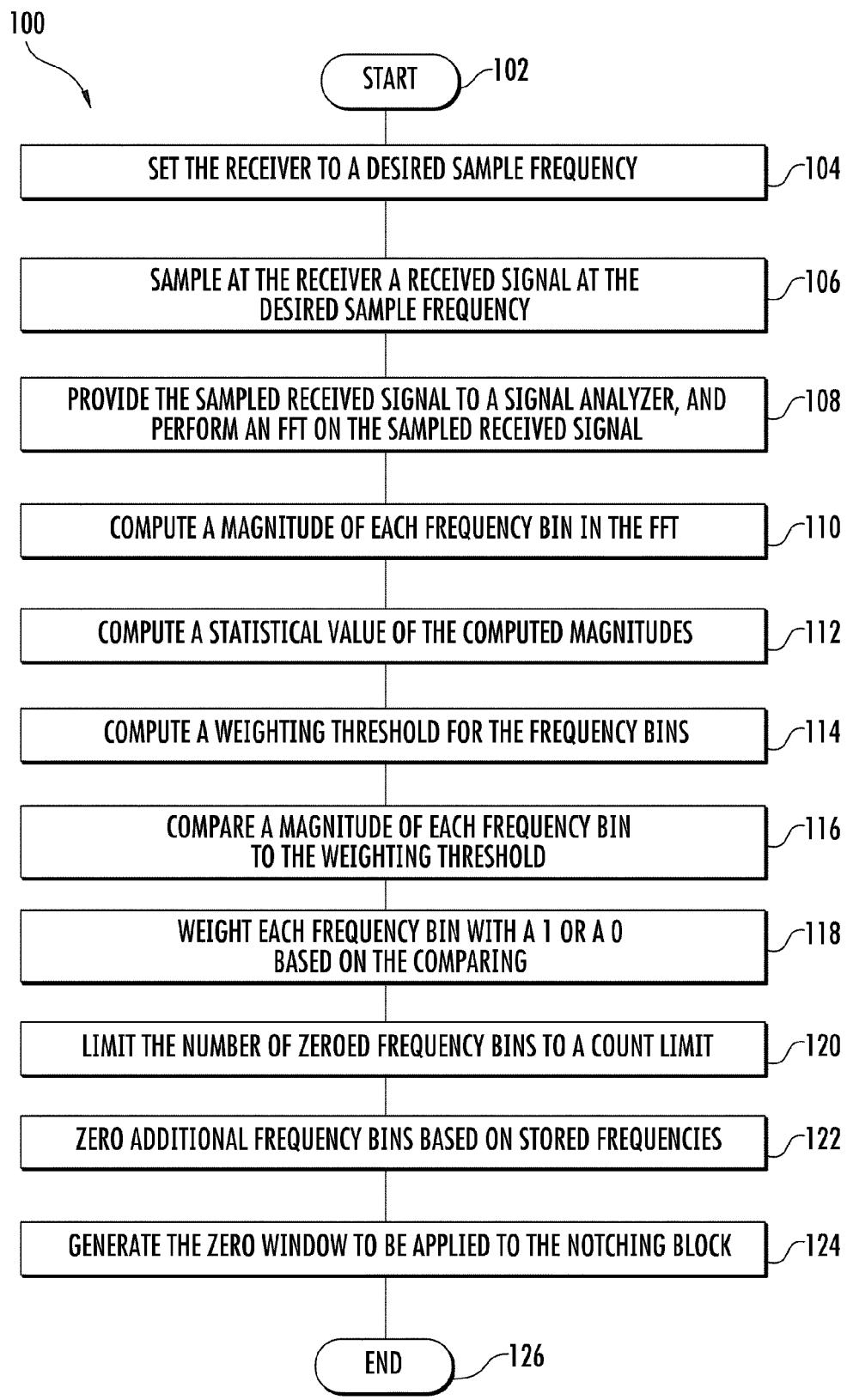
FIG. 4 is a flowchart for determining location of frequency notches to be generated in an output wideband complex signal that is to be transmitted by a wideband communications device in accordance with the present invention.

Referring now to the flowchart 100 in FIG. 4, determining location of the frequency notches in the output wideband complex signal will be discussed. From the start (Block 102), the receiver 74 is set to a desired sample frequency at Block 104, and the receiver digitally samples a received signal at this frequency at Block 106. The sampled received signal is provided to the signal analyzer 77 that is coupled to the receiver 74, and an FFT is performed by the signal analyzer on the sampled received signal at Block 108.

The signal analyzer 77 computes a magnitude of each frequency bin in the FFT at Block 110. The magnitudes may be computed directly, or may be computed from approximation. A statistical value of the computed magnitudes is computed at Block 112. The statistical value may be an average value or a median value, for example.

Before a determination can be made as to which frequency bins in the FFT are to be weighed with either a 1 or a 0, a weighting threshold is computed in Block 114. The weighting threshold, for example, may be equal to the computed statistical value multiplied by a profile of a reference waveform that is also multiplied by a reference number. The profile of the reference waveform may be based on the sampled signal received in Block 106, which has a determined shape and width in frequency. The reference number may be 1.25 for example, which corresponds to 2 dB. Alternatively, the reference number may be a value other than 1.25.

The magnitude of each frequency bin is compared to the weighting threshold in Block 116. Each frequency bin is weighted with a 1 or a 0 at Block 118 based on the comparing. If the magnitude of a frequency bin is greater than the weighting threshold, then the frequency bin will be weighted with a 0. Alternatively, if the magnitude of a frequency bin is less than the weighting threshold, then the frequency bin will be weighted with a 1.

The number of frequency bins being zeroed is limited to a count limit at Block 120. The count limit may correspond to a percentage of the frequency bins, such as 25 percent, for example. The number of frequency bins being zeroed needs to be limited to allow sufficient room for the information to be transmitted in the output wideband complex signal and still be recoverable. Selection of the frequency bins being limited may be based on the ones having the largest magnitude.

Additional frequency bins may be zeroed at Block 122 based on frequencies stored in a memory 78 within the signal analyzer 77. The stored frequencies correspond to known narrowband communications devices operating in the area that may be inactive when the receiver 74 is in the scan mode. Again, the number of frequency bins being zeroed may be limited to the having the largest magnitude. The zero window to be applied in the notching block 46 is provided at Block 124. The flowchart 100 ends at Block 126.

Referring now to the flowchart 200 in FIG. 5, generating an output wideband complex signal with at least one frequency notch therein will be discussed. From the start (Block 202), a complex input signal is processed as an M length block at Block 204. M is defined as being equal to N/2, where N=refers to the size of the N point complex FFT. The process runs every M samples. The complex input signal is stored in a input buffer 41 at Block 206. The filter has a length L, and the arrays are complex values. A new input frame of M complex input samples is also started in the input buffer 41 at Block 208.

The array taps for the FIR filter 42 are defined at Block 210. The taps may be re-ordered for fast access. This allows straightforward pointer arithmetic that is typical of DSP and FPGA technology. The N point complex FFT for the different tap arrays is computed by the FFT block 44 at Block 212. The FIR filter 42 may have order taps h0 ... hn−1, for example, where increasing the order taps represent delayed scalar taps of the desired filter response.

Figure 6:
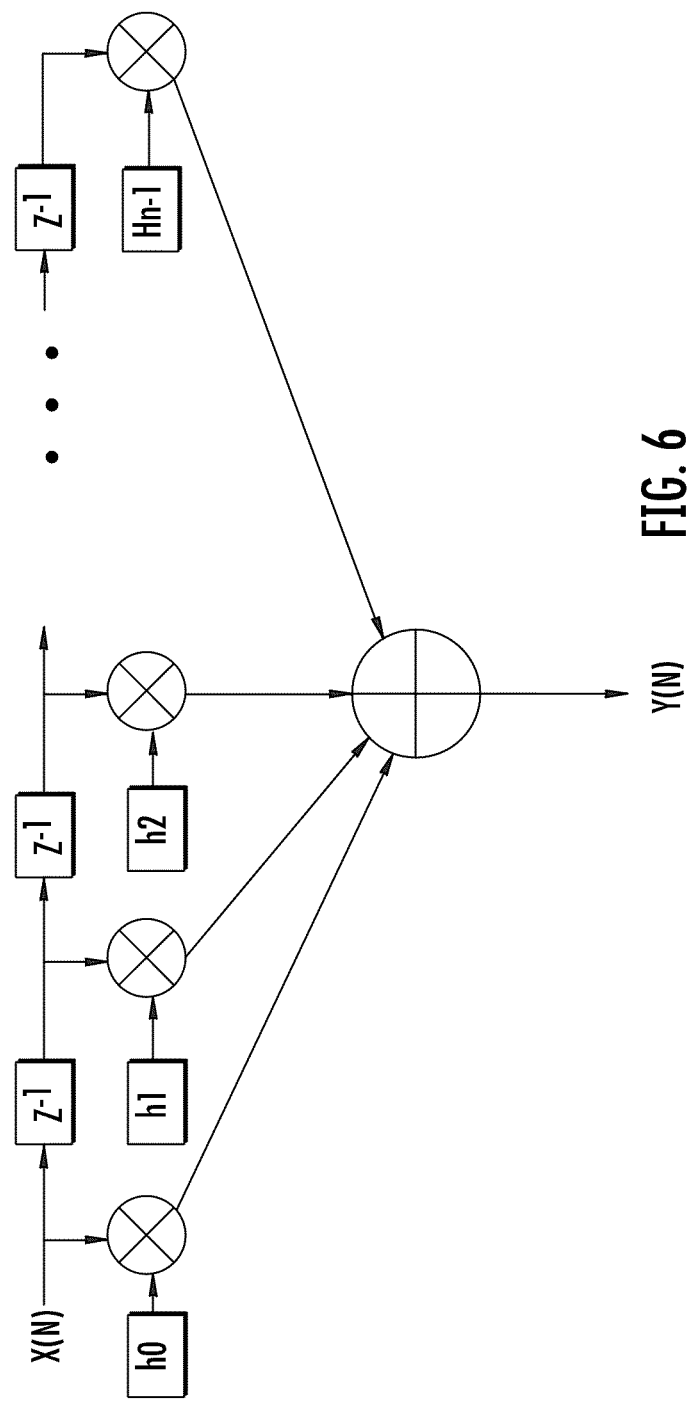
FIG. 6 is a block diagram of a FIR filter in accordance with the present invention.

As illustrated in FIG. 6, the ordered filter of length L allows the taps to be placed modulo N, where N is the length of the complex FFT size. The impulse filter length L is modulo in size N and represents the desired low pass filter response needed to provide a flat composite filter bank response. For illustration purposes, assume N=4 and L=16. The filter h0 ... hn−1 would be reordered as follows: taps [0, ... 15]=[(h0, h4, h8, h12), (h1, h5, h9, h13), (h2, h6, h10, h14), (h3, h7, h11, h15)]. The ordered taps in each pair of parenthesis corresponds to a respective sub-filter. Because the input signal is being decimated, only parts of the signal are being examined, as readily appreciated by those skilled in the art. The resulting values from the sub-filters are multiplied together in time to provide an input of the FFT block 44.

Figure 7:
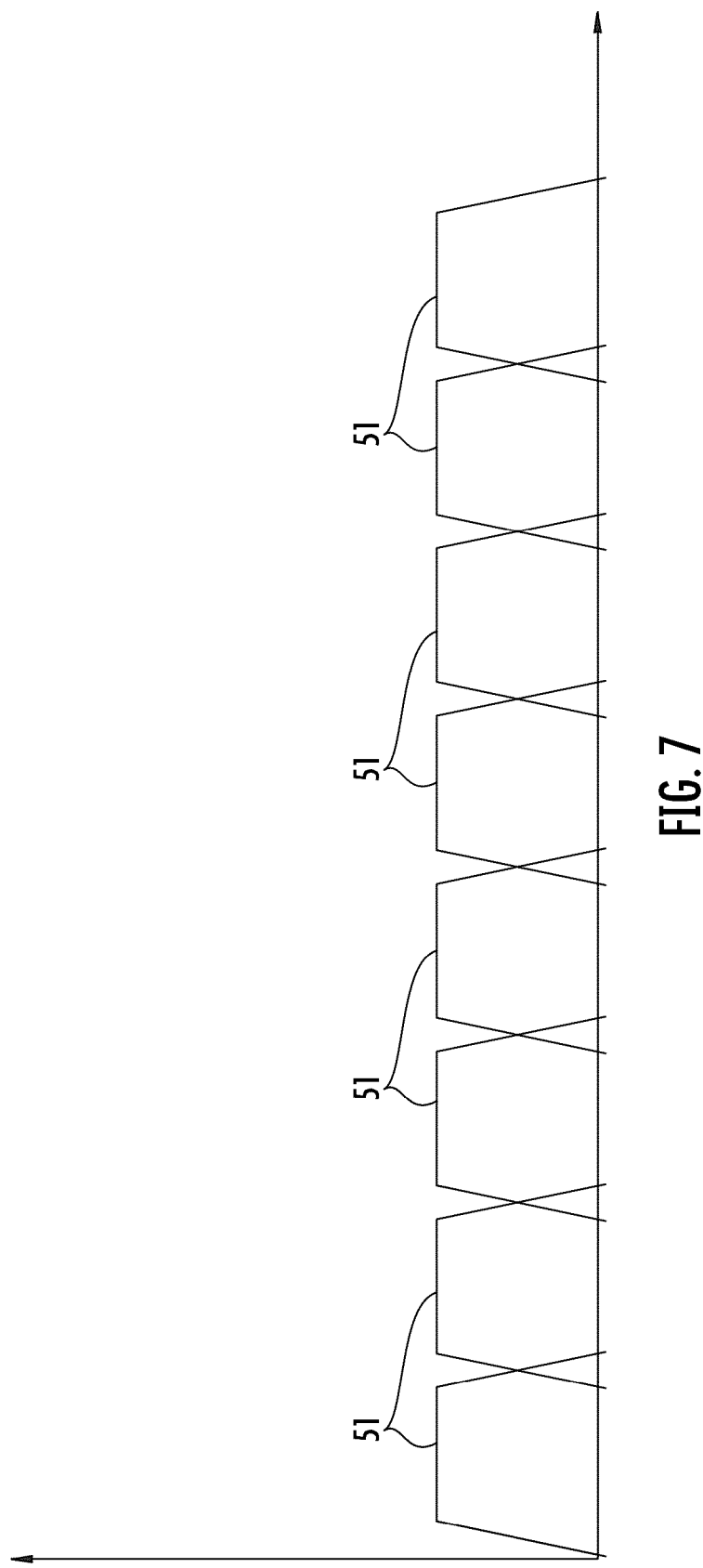
FIG. 7 is a block diagram illustrating a basic filter structure in which the filters are anti-symmetric in a transition region to provide a flat composite response in accordance with the present invention.

A basic filter structure for the FIR filter 42 is illustrated in FIG. 7. The FIR filter 42 may have a filter gain halfway between frequency bins 51 of the FFT block 44 with a magnitude of at least 0.5, and is anti-symmetric so that a composite filter bank is spectrally flat. The FFT block 44 may have a gain of 0 one frequency bin away from a center frequency bin to reduce FFT leakage between frequency bins. Reducing leakage between frequency bins advantageously reduces splatter and spillover, which improves performance of the filter.

The FFT bin zeroing rule is applied in the notching block 46 at Block 214. The FFT bin zeroing rule is based on the flowchart 100 provided in FIG. 4. If frequency bins are zeroed, the output spectrum is a high quality reproduction of the input with a notch inserted at the desired frequency bin removed. A depth of the notch can be set at the desired level when the zeroing window is not set to a zero value (value greater than zero, but less than 1.0). Alternatively, if the FIR filter 42 is designed properly and no frequency bins are zeroed, the output is a high quality reproduction of the input signal.

The N point complex IFFT is computed by the IFFT block 47 at Block 216. An output vector from the IFFT block 47 is provided to an output buffer 48 at Block 218. The wideband output complex signal is reconstructed in the interpolator 49 at Block 220. The interpolator 49 operates based on a SINC filter, which corresponds to (sin x)/x. The reconstructed wideband output complex signal with a notch generated therein is output at Block 222. The loop variables for the next iteration are updated at Block 224. The method ends at Block 226.

Another aspect is directed to a method for generating an output wideband complex signal 94 with at least one frequency notch 96 therein using a communications device 20(1) comprising a modulator 38 and a filter 40 downstream therefrom. The method may comprise filtering a wideband complex signal using a finite impulse response (FIR) filter 42 comprising L taps to generate N output values, with L>N, and generating a Fourier transform of the wideband complex signal using a Fast Fourier Transform (FFT) block 44 downstream from the FIR filter 42. The FFT block 44 may have a length N so that filter transition regions occur between frequency bins of the FFT block 44. The method may further comprise generating the at least one frequency notch 96 in the Fourier transform using a notching block 46 downstream from the FFT block 44, and generating an inverse Fourier transform of the Fourier transform with the at least one frequency notch 96 therein using an Inverse Fast Fourier Transform (IFFT) block 47 downstream from the notching block 46, with the IFFT having a length N.

Another aspect of the above-discussed filter is to apply a similar concept to address narrowband interference excision. Narrowband interference may result from the presence of background UHF interference, legacy interferes and multiple access interference. Narrowband interference affects the signal-to-noise ratio (SNR) of the received wideband complex signal. The filter may be configured to eliminate the region corresponding to the narrowband interference in the received wideband complex signal, or may be configured to make the received wideband complex signal look flat over the bandwidth.

Figure 8:
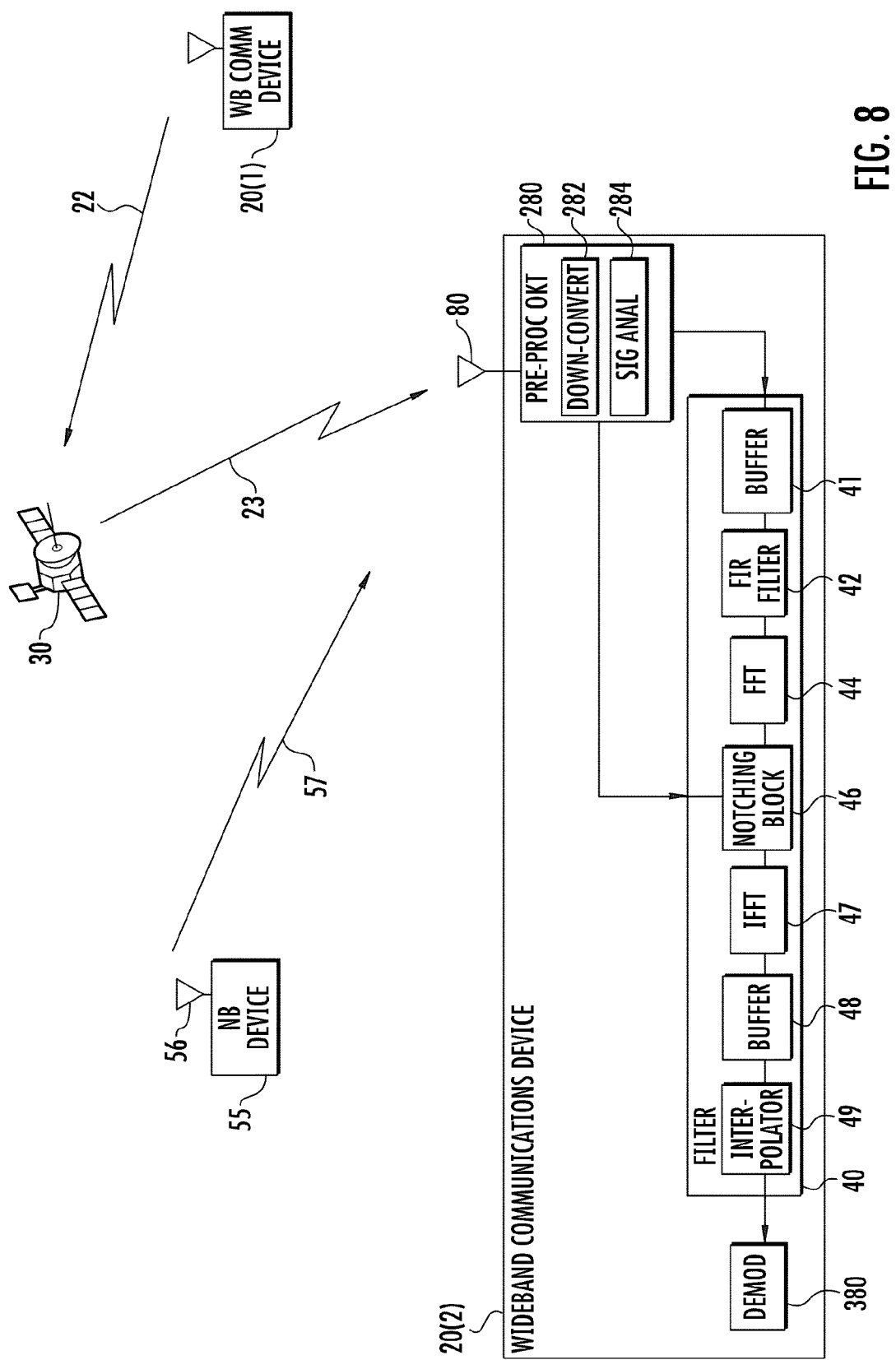
FIG. 8 is a block diagram of a wideband communications device receiving a wideband complex signal within a satellite communications system in the presence of a narrowband device providing an undesired narrowband interference signal in accordance with the present invention.

Referring now to FIG. 8, a block diagram of the wideband communications device 20(2) receiving a downlink signal 23 (i.e., a wideband complex signal) within the satellite communications system in the presence of a narrowband device 55 will now be discussed. The narrowband device 55 includes an antenna 56 for transmitting an undesired narrowband interference signal 57. The narrowband device 55 may be a narrowband communications device, similar to the narrowband communication devices 50(1), 50(2) illustrated in FIG. 1. Alternatively, the narrowband device 55 may be a jammer, for example.

In the illustrated wideband communications device 20(2), the filter 40 is now between a demodulator 380 and pre-processing circuitry 280. The filter 40 includes a notching block 46 for generating the received wideband complex signal with at least one frequency notch therein. The at least one frequency notch corresponds to the operating frequency of the narrowband device 55 providing the undesired narrowband interference component.

The pre-processing circuitry 280 includes a down-converter 282 for converting the received wideband complex signal including the undesired narrowband interference component therein to a baseband signal. A signal analyzer 284 is coupled to the down-converter 282 for analyzing the baseband signal for determining the frequency of the undesired narrowband interference component.

Figure 9:
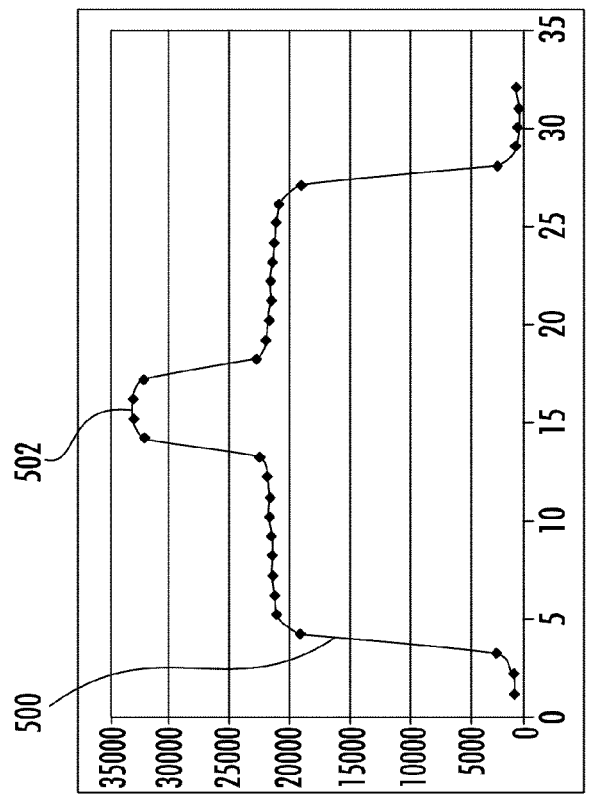
FIG. 9 is a graph illustrating a received signal spectrum of the wideband complex signal received by the wideband communications device shown in FIG. 8 along with the undesired narrowband interference signal therein.

The pre-processing circuitry 280 monitors the received wideband complex signals in real time for determining if undesired interference components are included therein. For illustration purposes, FIG. 9 illustrates a received signal spectrum 500 received by the wideband communications device 20(2). The received signal spectrum 500 includes a spike (i.e., undesired interference component) 502 corresponding to an operating frequency of the narrowband device 55.

Figure 10:
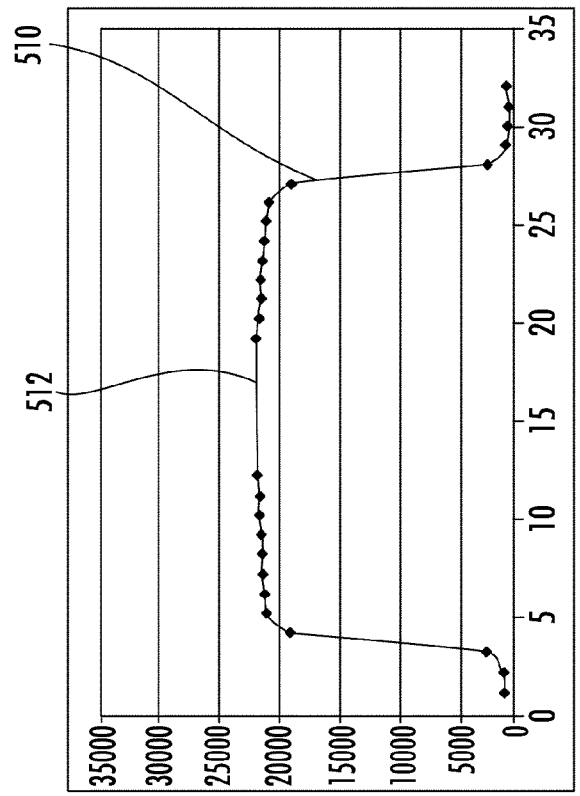
FIG. 10 is a graph illustrating the received wideband complex signal with a notch generated therein based on the received signal spectrum illustrated in FIG. 9 to suppress the undesired signal component.

As will be discussed in greater detail below, the purpose of the pre-processing circuitry 280 is to remove any narrowband interference components so that the received wideband complex signal is relatively flat, i.e., it looks like noise. For illustration purposes, FIG. 10 illustrates the received wideband complex signal 510 after filtering by the filter 40 with a notch 512 generated therein based on the received signal spectrum illustrated in FIG. 9 to suppress the undesired signal component.

As noted above, the notching block 46 generates the at least one frequency notch for eliminating the region corresponding to the narrowband interference, or alternatively, for making the received wideband complex signal look flat over the bandwidth. In the later approach, the filter 40 partially removes the undesired narrowband interference component in the received wideband complex signal. The received wideband complex signal has a profile that is different than a profile of the undesired narrowband interference component, and the notching block 46 generates the at least one frequency notch so that a profile of the undesired narrowband interference component matches the profile of the received wideband complex signal. In other words, the received signal should look like white noise over the bandwidth.

Figure 11:
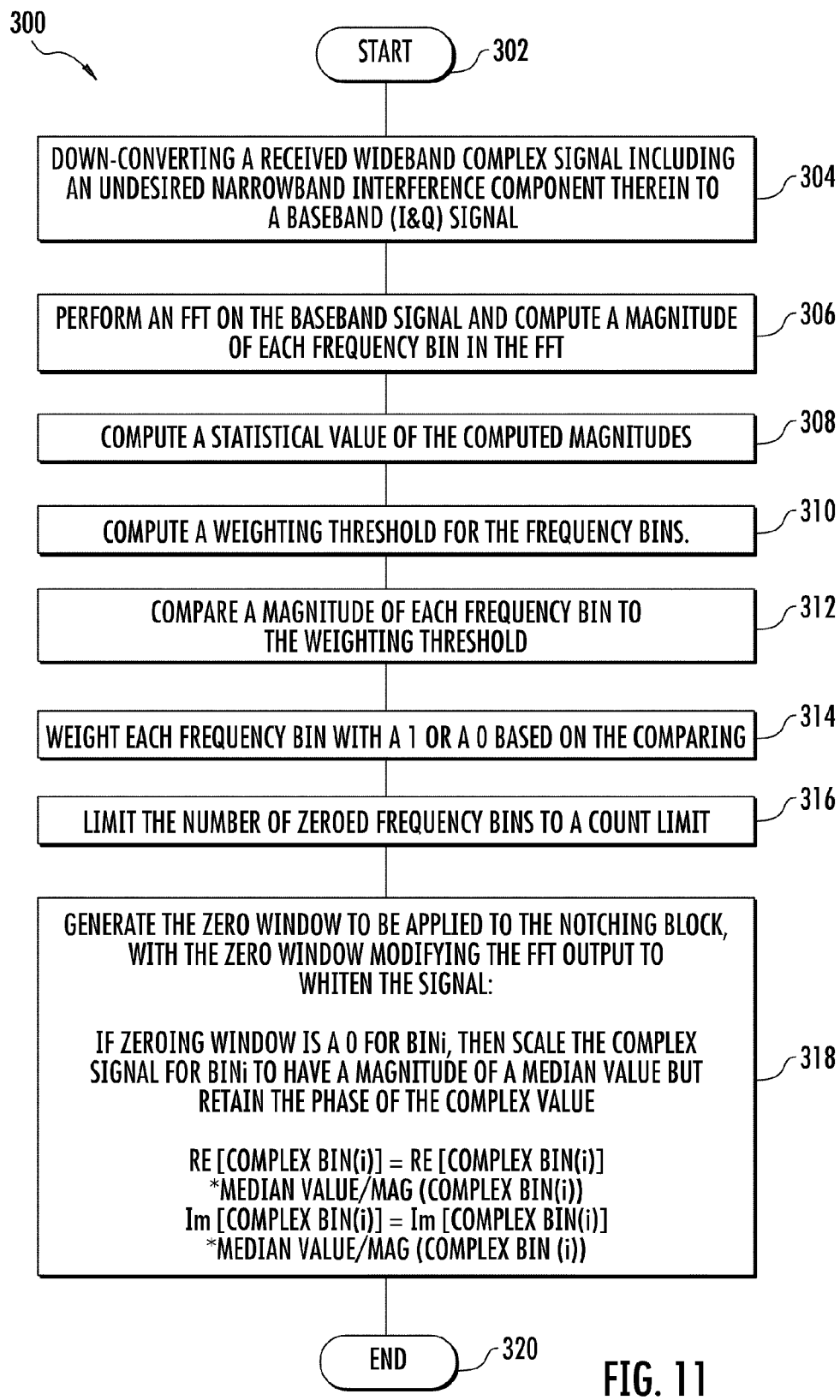
FIG. 11 is a flowchart for determining location of frequency notches to be generated in a received wideband complex signal in accordance with the present invention.

Referring now to the flowchart 300 in FIG. 11, determining location of the frequency notches in the received wideband complex signal will be discussed. From the start (Block 302), the down-converter 282 down-converts the received signal spectrum (i.e., wideband complex signal 500 including the undesired narrowband interference component 502 therein) to a baseband (I & Q) signal at Block 304. The signal analyzer 284 performs an FFT on the baseband signal and computes a magnitude of each frequency bin in the FFT at Block 306. The magnitudes may be computed directly, or may be computed from approximation. A statistical value of the computed magnitudes is computed at Block 308. The statistical value may be an average value or a median value, for example.

Before a determination can be made as to which frequency bins in the FFT are to be weighed with either a 1 or a 0, a weighting threshold is computed in Block 310. The weighting threshold, for example, may be equal to the computed statistical value multiplied by a profile of a reference waveform that is also multiplied by a reference number. The profile of the reference waveform may be based on the received wideband complex signal, which has a determined shape and width in frequency. The reference number may be 1.25 for example, which corresponds to 2 dB. Alternatively, the reference number may be a value other than 1.25.

The magnitude of each frequency bin is compared to the weighting threshold in Block 312. Each frequency bin is weighted with a 1 or a 0 at Block 314 based on the comparing. If the magnitude of a frequency bin is greater than the weighting threshold, then the frequency bin will be weighted with a 0. Alternatively, if the magnitude of a frequency bin is less than the weighting threshold, then the frequency bin will be weighted with a 1.

The number of frequency bins being zeroed is limited to a count limit at Block 316. The count limit may correspond to a percentage of the frequency bins, such as 25 percent, for example. The number of frequency bins being zeroed needs to be limited to allow sufficient room for the information to be recovered in the received wideband complex signal. Selection of the frequency bins being limited may be based on the ones having the largest magnitude.

The zero window to be applied in the notching block 46 is provided at Block 124. However, since the pre-processing circuitry 280 is to make the received wideband complex signal look like nose, it is not necessary to completely remove the narrowband interference component since this portion of the signal spectrum also includes a portion of the information signal to be recovered. Consequently, the zero-window is modified at Block 318 so that the output of the FFT block 44 in the filter 40 appears as a white signal. For example, if the zeroing window is a 0 for BINi, then the complex signal for BINi is scaled to have a magnitude of a median value but retain the phase of the complex value, as follows:

$Re[\text{complex bin}(i)] = Re[\text{complex bin}(i)] * \text{median value}/\text{mag}(\text{complexbin}(i))$ $Im[\text{complex bin}(i)] = Im[\text{complex bin}(i)] * \text{median value}/\text{mag}(\text{complexbin}(i))$ Similar to the filter 40 on the transmit side, regions of the signal that exceed the zeroing threshold can be used to suppress narrowband interference components on the receive side. Instead of completely eliminating the portion of the received signal with the narrowband interference component therein, the filter 40 filters the received signal so that the narrowband interference component is suppressed so that a profile thereof matches a profile of the other portions of the received signal. The flowchart 300 ends at Block 320.

Figure 5:
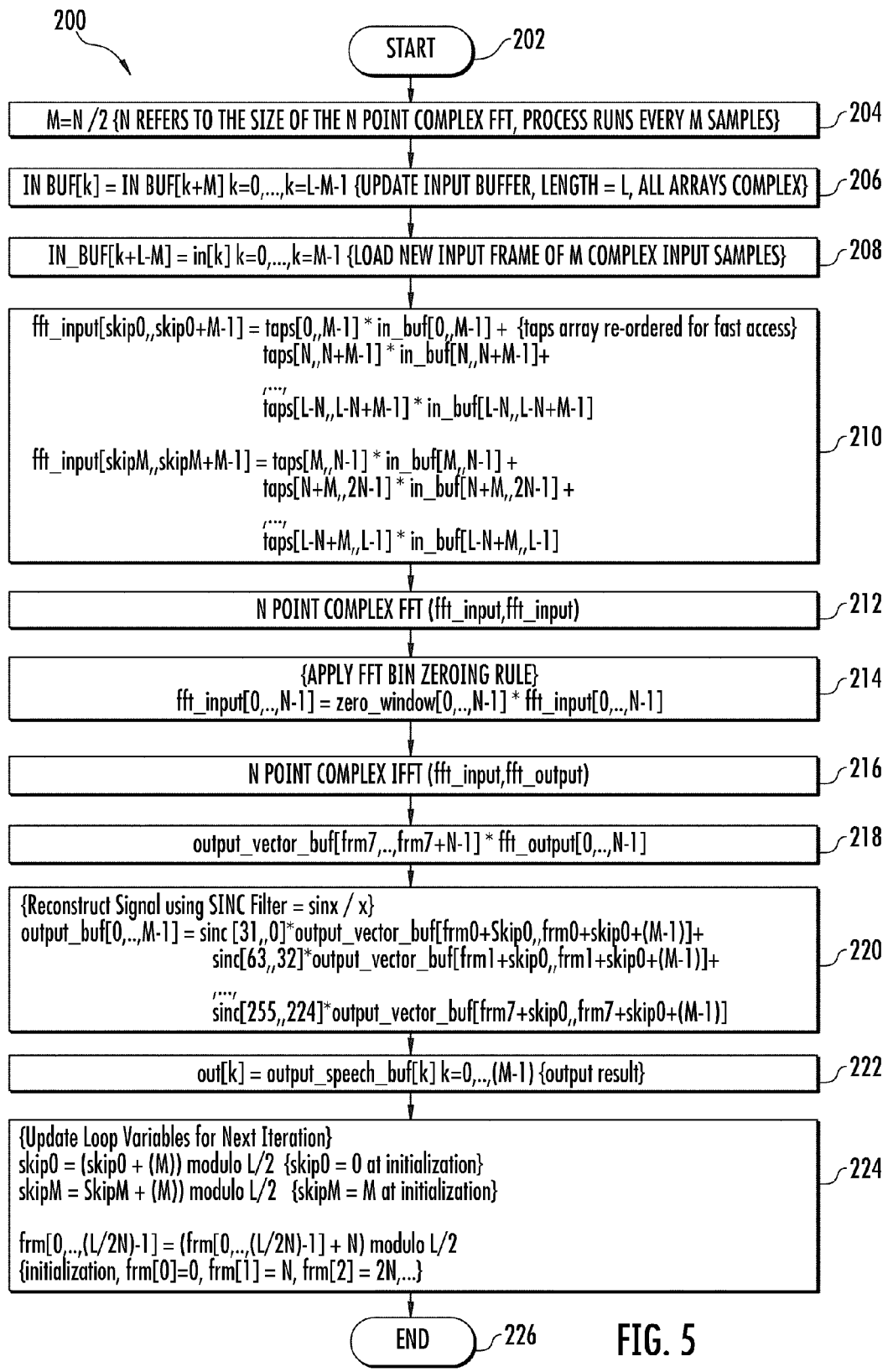
FIG. 5 is a flowchart for generating an output wideband complex signal with at least one frequency notch therein in accordance with the present invention.

After determining the modified zero window to be applied to the notching block 46, reference is now directed to the flowchart 200 illustrated in FIG. 5. The steps for generating a received wideband complex signal 510 with at least one frequency notch 512 therein is similar to the steps performed on the transmit side of the wideband communications device 20(1). These steps will not be discussed due to the similarity therebetween, as readily appreciated by those skilled in the art.

The filter 40 comprises an input buffer 41 for buffering the received wideband complex signal with the interference component therein as provided by the processing circuitry 280. The finite impulse response (FIR) filter 42 is downstream from the input buffer 41. The FIR filter 42 comprises L taps to generate N output values, with L>N. A Fast Fourier Transform (FFT) block 44 is downstream from the FIR filter 42 and has a length N so that filter transition regions occur between frequency bins of the FFT block.

The size of the FFT block 44 is advantageously matched to the outputs of the FIR filter 42, and the FIR filter 42 functions as a reference filter. The reference filter is effectively being applied to each frequency bin in the frequency domain as a window. This window is being applied across the FFT history to implement a larger effective filter using the fact that the signal is also being decimated. Since the size of the FFT block 44 is matched to the outputs of the FIR filter 42, this advantageously reduces processor loading requirements. The notching block 46 is downstream from the FFT block 44 to generate the frequency notches in the output wideband complex signal.

An Inverse Fast Fourier Transform (IFFT) block 47 is downstream from the notching block 46 and also has a length N. An output buffer 48 is downstream from the IFFT block 47 for buffering the outputs therefrom. An interpolator 48 is downstream from the output buffer 48 for interpolating values between the frequency bins. As part of the interpolating, an overlay and add is performed to provide a high enough sample rate to reconstruct the output of each of the N frequency bins. The sampling needs to be twice as fast as the bandwidth, as stated by the Nyquest theorem. The demodulator 380 demodulates the received wideband complex signal with the at least one frequency notch therein as output by the filter 40.

Another aspect is directed to a method for generating a received wideband complex signal 510 with at least one frequency notch 512 therein. The method comprises processing a received wideband complex signal 500 including an undesired narrowband interference component 502 therein, determining a frequency of the undesired narrowband interference component, and using a filter 40 for filtering the wideband complex signal including the undesired narrowband interference component to generate a received wideband complex signal 510 with at least one frequency notch 512 therein to suppress the undesired narrowband interference component 502.

The filtering may comprise filtering the wideband complex signal including the undesired narrowband interference component therein using a finite impulse response (FIR) filter 42 comprising L taps to generate N output values, with L>N, and generating a Fourier transform of the wideband complex signal using a Fast Fourier Transform (FFT) block 44 downstream from the FIR filter 42. The FFT block 44 may have a length N so that filter transition regions occur between frequency bins of the FFT block.

The filtering may further comprise generating the at least one frequency notch 512 in the Fourier transform using a notching block 46 downstream from the FFT block 44, and generating an inverse Fourier transform of the Fourier transform with the at least one frequency notch 512 therein using an Inverse Fast Fourier Transform (IFFT) block 47 downstream from the notching block 46, with the IFFT having a length N. The received wideband complex signal with at least one frequency notch therein may then be demodulated.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device comprising:
    a modulator; and
    a filter downstream from said modulator and operable to generate an output wideband complex signal with at least one frequency notch therein, said filter comprising a finite impulse response (FIR) filter comprising L taps to generate N output values, with L>N,
    a Fast Fourier Transform (FFT) block downstream from said FIR filter and having the length N so that filter transition regions occur between frequency bins of said FFT block,
    a notching block downstream from said FFT block and operable to generate the at least one frequency notch, and
    an Inverse Fast Fourier Transform (IFFT) block downstream from said notching block and having the length N;
    said filter operating with a block length of M, with M =N/2, and wherein the N output values are filtered every M samples in time.

2. The communications device according to claim 1, wherein said filter further comprises an interpolate block downstream from said IFFT block.

3. The communications device according to claim 1, wherein said FIR filter has an impulse response with zeros at N spaced values.

4. The communications device according to claim 1, wherein said filter adaptively changes the at least one frequency notch.

5. The communications device according to claim 1, wherein said filter operates within a range of 300 to 3,000 MHz.

6. A method for generating an output wideband complex signal with at least one frequency notch therein, the method comprising:
    modulating an output wideband complex signal to be transmitted; and
    using a filter for filtering the modulated output wideband complex signal to include the at least one frequency notch therein, the filtering comprising
        filtering the modulated output wideband complex signal using a finite impulse response (FIR) filter comprising L taps to generate N output values, with L >N,
        generating a Fourier transform of the modulated wideband complex signal using a Fast Fourier Transform (FFT) block downstream from the FIR filter, the FFT block having a length N so that filter transition regions occur between frequency bins of the FFT block,
        generating the at least one frequency notch in the Fourier transform using a notching block downstream from the FFT block, and
        generating an inverse Fourier transform of the Fourier transform with the at least one frequency notch therein using an Inverse Fast Fourier Transform (IFFT) block downstream from the notching block, the IFFT block having the length N;
    the filter operating with a block length of M, with M =N/2, and wherein the N output values are filtered every M samples in time.

7. The method according to claim 6, wherein the filter further comprises an interpolate block downstream from the IFFT block for interpolating outputs therefrom.

8. The method according to claim 6, wherein the FIR filter has an impulse response with zeros at N spaced values.

9. A communications device comprising:
    a modulator; and
    a filter downstream from said modulator and operable to generate an output wideband complex signal with at least one frequency notch therein, said filter comprising a finite impulse response (FIR) filter comprising L taps to generate N output values, with L>N, a Fast Fourier Transform (FFT) block downstream from said FIR filter and having the length N so that filter transition regions occur between frequency bins of said FFT block, a notching block downstream from said FFT block and operable to generate the at least one frequency notch, and an Inverse Fast Fourier Transform (IFFT) block downstream from said notching block and having the length N;

said filter having a filter gain halfway between frequency bins of said FFT block with a magnitude of at least 0.5, and is anti-symmetric so that a composite filter bank is spectrally flat.

10. The communications device according to claim 9, wherein said filter further comprises an interpolate block downstream from said IFFT block.

11. The communications device according to claim 9, wherein said FIR filter has an impulse response with zeros at N spaced values.

12. The communications device according to claim 9, wherein said filter adaptively changes the at least one frequency notch.

13. The communications device according to claim 9, wherein said filter operates within a range of 300 to 3,000 MHz.

14. A communications device comprising:
a modulator; and
a filter downstream from said modulator and operable to generate an output wideband complex signal with at least one frequency notch therein, said filter comprising
a finite impulse response (FIR) filter comprising L taps to generate N output values, with L>N,
a Fast Fourier Transform (FFT) block downstream from said FIR filter and having the length N so that filter transition regions occur between frequency bins of said FFT block, said FFT block having a gain of zero one frequency bin away from a center frequency bin,
a notching block downstream from said FFT block and operable to generate the at least one frequency notch, and
an Inverse Fast Fourier Transform (IFFT) block downstream from said notching block and having the length N.

15. The communications device according to claim 14, wherein said filter further comprises an interpolate block downstream from said IFFT block.

16. The communications device according to claim 14, wherein said FIR filter has an impulse response with zeros at N spaced values.

17. The communications device according to claim 14, wherein said filter adaptively changes the at least one frequency notch.

18. The communications device according to claim 14, wherein said filter operates within a range of 300 to 3,000 MHz.

19. A method for generating an output wideband complex signal with at least one frequency notch therein, the method comprising:
modulating an output wideband complex signal to be transmitted; and
using a filter for filtering the modulated output wideband complex signal to include the at least one frequency notch therein, the filtering comprising
filtering the modulated output wideband complex signal using a finite impulse response (FIR) filter comprising L taps to generate N output values, with L >N,
generating a Fourier transform of the modulated wideband complex signal using a Fast Fourier Transform (FFT) block downstream from the FIR filter, the FFT block having a length N so that filter transition regions occur between frequency bins of the FFT block,
generating the at least one frequency notch in the Fourier transform using a notching block downstream from the FFT block, and
generating an inverse Fourier transform of the Fourier transform with the at least one frequency notch therein using an Inverse Fast Fourier Transform (IFFT) block downstream from the notching block, the IFFT block having the length N;
the filter having a filter gain halfway between frequency bins of the FFT block with a magnitude of at least 0.5, and is anti-symmetric so that a composite filter bank is spectrally flat.

20. The method according to claim 19, wherein the filter further comprises an interpolate block downstream from the IFFT block for interpolating outputs therefrom.

21. The method according to claim 19, wherein the FIR filter has an impulse response with zeros at N spaced values.

22. A method for generating an output wideband complex signal with at least one frequency notch therein, the method comprising:
modulating an output wideband complex signal to be transmitted; and
using a filter for filtering the modulated output wideband complex signal to include the at least one frequency notch therein, the filtering comprising
filtering the modulated output wideband complex signal using a finite impulse response (FIR) filter comprising L taps to generate N output values, with L >N,
generating a Fourier transform of the modulated wideband complex signal using a Fast Fourier Transform (FFT) block downstream from the FIR filter, the FFT block having a length N so that filter transition regions occur between frequency bins of the FFT block, the FFT block having a gain of zero one frequency bin away from a center frequency bin,
generating the at least one frequency notch in the Fourier transform using a notching block downstream from the FFT block, and
generating an inverse Fourier transform of the Fourier transform with the at least one frequency notch therein using an Inverse Fast Fourier Transform (IFFT) block downstream from the notching block, the IFFT block having the length N.

23. The method according to claim 22, wherein the filter further comprises an interpolate block downstream from the IFFT block for interpolating outputs therefrom.

24. The method according to claim 22, wherein the FIR filter has an impulse response with zeros at N spaced values.

* * * * *